March 29, 1949.  H. E. BRANNON  2,465,573
SPOOL

Filed March 7, 1947

INVENTOR.
HERBERT E. BRANNON
BY
Richard A. Parsons
ATTY.

Patented Mar. 29, 1949

2,465,573

UNITED STATES PATENT OFFICE 2,465,573

SPOOL

Herbert E. Brannon, Dryden, Mich.; Charles W. Hayner administrator of said Herbert E. Brannon, deceased Application March 7, 1947, Serial No. 733,016

9 Claims. (Cl. 242—118)

This invention relates to spools. The principal object of the invention is to provide a spool which is exceptionally rugged, yet light in weight.

Another object of the invention is to provide such a spool which can be easily and economically manufactured.

For a detailed disclosure of the invention reference is made to the following specification and the accompanying drawings, wherein.

Figure 2:
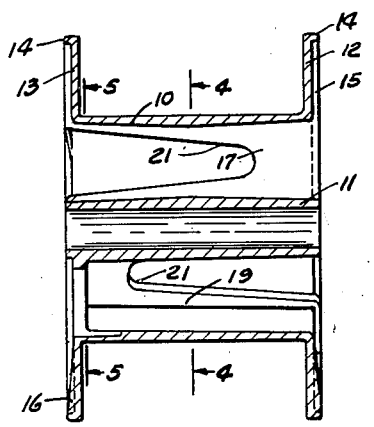
Figure 2 is a cross-sectional view taken on substantially the line 2—2 of Figure 1.
Figure 1:
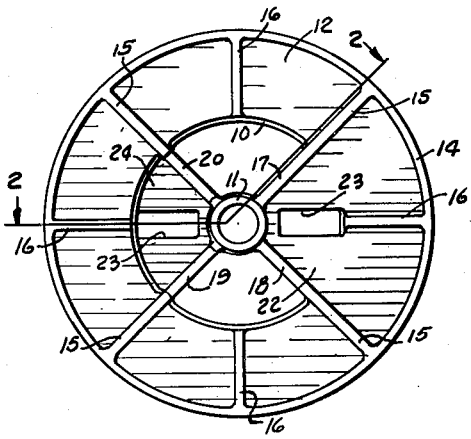
Figure 1 is an end elevational view of a spool embodying the invention.
Figure 3:
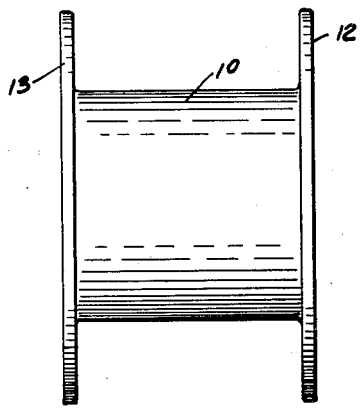
Figure 3 is a side elevational view.
Figure 4:
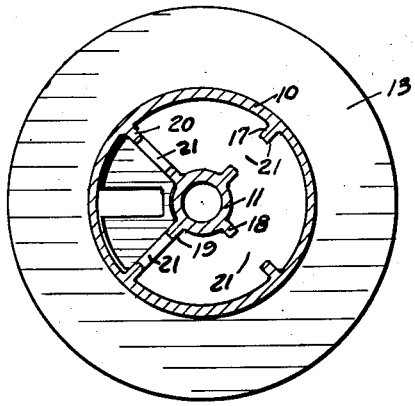
Figure 4 is a cross-sectional view taken on substantially the line 4—4 of Figure 2.
Figure 5:
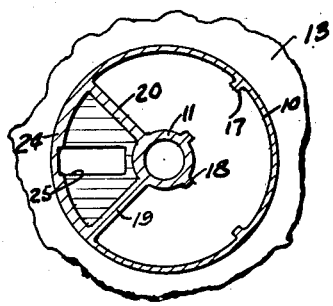
Figure 5 is a fragmentary cross-sectional view taken on substantially the line 5—5 of Figure 2.

The spool disclosed herein is preferably a one piece metal casting. It comprises an outer tubular portion 10 and an inner tubular portion or hub 11 coaxial therewith. The radially outer surface of the outer tubular portion 10 and the radially inner surface of the hub 11 are cylindrical. The radially inner surface of the portion 10 and the radially outer surface of the hub 11 are relatively thick at the axial center and decrease in thickness toward the axial extremities. This difference in thickness provides extra strength in the casting, as well as the necessary draught to facilitate casting.

The tubular outer portion is provided with radially extending end flanges 12 and 13. An outwardly projecting circumferential stiffening rib 14 extends around the periphery of each flange 12 and 13. Four equidistantly angularly spaced stiffening ribs 16 on the axially outer faces of the flanges 12 and 13 extend between the rib 14 and the tubular outer portion 10. Four other radial ribs 15 intermediate the ribs 16 are also employed to stiffen the flanges 13 and 14. The ribs 15 merge into four radial webs 17, 18, 19 and 20 which extend between and connect the tubular outer portion 10 to the hub 11.

The webs 17 to 20 are flat and are so arranged that the spool axis lies in the central plane of each web. The webs 17 to 20 are equidistantly spaced apart angularly. In order to reduce the weight of the spool, a deep notch 21 is formed in each web. Each notch extends from one end of the spool to about one fourth of the length of the spool from the other end of each web. It will be noted that the notches 21 in two adjacent webs 17 and 18 extend into the webs from one axial extremity of the spool, while the notches in the webs 19 and 20 which are adjacent to each other extend into the webs from the other axial extremity of the spool. The reason for this will appear presently.

The flange 12 on one end of the spool is extended radially inwardly between the webs 17 and 18 to the hub 11 so that that portion, and that portion only, of the flange 12 forms a quadrant shaped segment 22. A rectangular opening 23 is cut in the segment 22 to receive a driving lug or dog, not shown.

The flange 13 on the opposite end of the spool is extended radially inwardly to the hub 11 between the webs 19 and 20 to form a quadrant shaped segment 24 like the segment 22. The segment 24 is provided with an opening 25 to receive a driving lug.

It will be noted that the angularly opposite edges of the two segments 22 and 24 merge into the solid ends of the adjacent webs. That is the reason for extending the notches in two adjacent webs into the latter from the same end of the spool.

In addition to the draught provided on the two tubular portions 10 and 11, all corners are filleted to facilitate casting.

The spool is intended to be employed with a conventional wire winding machine. The hub 11 is slipped over an arbor on which the hub may rotate, and the spool is driven by driving lugs or dogs inserted into the openings 23 and 25 in the segments 22 and 24.

From the foregoing it will be seen that the present invention provides a spool of rugged, yet very light construction. Much of the weight of solid webs and solid end flanges has been eliminated without sacrifice of strength, yet those parts which are necessary to support and drive the outer part of the spool on which wire is to be wound are provided. A great saving in metal is also accomplished.

The scope of the invention is indicated in the appended claims.

I claim:

1. A spool comprising a generally tubular portion having radially extending end flanges, a tubular hub located in the bore of said tubular portion coaxially thereof, a plurality of planar webs connecting said tubular hub and tubular portion, the planes of said webs coinciding with the axis of said hub, each of said webs having a relatively deep axially extending notch therein extending axially inwardly from one axial extremity thereof.

2. A spool as defined in claim 1 wherein the notches in certain of said webs extend inwardly from one axial extremity of said spool and the notches in the rest of said webs extend axially inwardly from the opposite extremity of said spool.

3. A spool as defined in claim 1 wherein the interior of said hub is of uniform diameter throughout its axial extent and the wall of said hub is of greater thickness adjacent the axial center than at the axial extremities thereof.

4. A spool as defined in claim 1 wherein said end flanges are provided with radial external ribs.

5. A spool as defined in claim 1 wherein each end flange is provided with a radial extension projecting toward said hub and rigidly connected thereto.

6. A spool comprising radially spaced apart concentric tubes, said outer tube having radially outwardly extending end flanges thereon, a plurality of planar webs connecting said tubes together and extending from end to end of said spool, said webs being so arranged that the planes thereof include the axis of said tubes, said end flanges having radially inwardly extending continuations thereof rigidly connected to said inner tube, the angular extent of said continuations being equal to the angular distance between two adjoining webs.

7. A spool as defined in claim 6 wherein each web is provided with a relatively deep notch extending axially inward from one end of the web.

8. A spool as defined in claim 6 wherein said webs are at least four in number and each web is provided with a relatively deep notch, the notches in two adjacent webs extending axially inward from one end of the spool and the notches in two other adjacent webs extending axially inwardly from the opposite ends of the spool.

9. A spool as defined in claim 6 wherein said radially inward extensions are provided with openings for the reception of driving dogs.

HERBERT E. BRANNON.

REFERENCES CITED

The following references are of record in the file of this patent:

UNITED STATES PATENTS

| Number | Name | Date |
|---|---|---|
| 1,985,742 | Rea | Dec. 25, 1934 |
| 2,190,085 | Scholl | Feb. 13, 1940 |
| 2,397,362 | Markle, Jr. | Mar. 26, 1946 |

FOREIGN PATENTS

| Number | Country | Date |
|---|---|---|
| 641,735 | France | Aug. 9, 1928 |